(No Model.)

D. B. HAND & E. H. REITZEL.
Pipe Coupling.

No. 230,018. Patented July 13, 1880.

WITNESSES:
Francis McArdle
C. Sedgwick

INVENTOR:
D. B. Hand
E. H. Reitzel
BY Munn & Co
ATTORNEYS.

United States Patent Office.

DAVID B. HAND AND EPHRAIM H. REITZEL, OF COLUMBIA, PA.

PIPE-COUPLING.

SPECIFICATION forming part of Letters Patent No. 230,018, dated July 13, 1880.

Application filed March 11, 1880. (No model.)

*To all whom it may concern:*

Be it known that we, DAVID B. HAND and EPHRAIM H. REITZEL, of Columbia, in the county of Lancaster and State of Pennsylvania, have invented a new and useful Improvement in Pipe-Couplings, of which the following is a specification.

Our invention particularly relates to a means for connecting the heating-pipes between the cars of a railway-train, but is also applicable to other purposes.

The invention consists in a novel construction and arrangement of coupling devices, whereby provision is made for affording a universal motion to the pipes, as hereinafter more particularly described.

Figure 1:
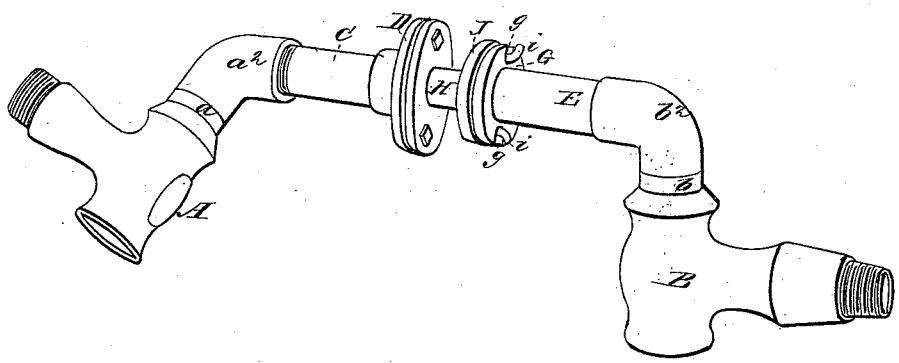
Figure 2:
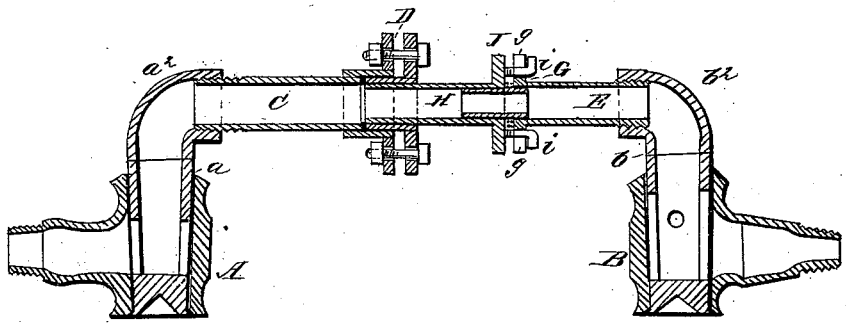

In the accompanying drawings, Figure 1 is a perspective view of our invention, and Fig. 2 is a longitudinal section of the same.

A represents a faucet at one end of the coupling, and B a similar faucet at the other end. The plugs $a$ $b$ of these faucets are hollow and open at the upper end of each, and thus each serves as a conduit, instead of the bib of the faucet.

To the upper end of the plug $a$ is attached an elbow, $a^2$, and to the upper end of the plug $b$ is attached an elbow, $b^2$. To the elbow $a^2$ is attached one end of a pipe, C, on the other end of which is a stuffing-box, D. To the elbow $b^2$ is attached one end of a pipe, E, on the other end of which is a flange, G, having in its periphery two notches, $g$ $g$, diametrically opposite each other.

Between the stuffing-box D and the flange G is a pipe, H, one end of which works telescopically through the stuffing-box D and in the pipe C, and the other end carries a flange, J, provided with two button-headed bolts, $i$ $i$.

The faucets A and B are inclined at about thirty degrees, more or less, with relation to each other.

The faucet A is attached to the end of the heating-pipe of one car, and the faucet B is attached to the end of the heating-pipe of another car.

When the cars are coupled the pipes are connected by means of the flanges G and J, the faces of which are brought together and secured by engaging the bolts $i$ $i$ with the notches $g$ $g$ and turning down the button-heads to the position shown in Fig. 1.

When the apparatus is in use the faucet A provides for vertical motion, the faucet B provides for lateral motion, and the pipe H, working telescopically in the pipe C and through the stuffing-box D, provides for longitudinal motion.

By the construction and arrangement above described a universal motion is provided, and a coupling is produced which possesses all the advantages and none of the disadvantages of a rubber, canvas, or other non-metallic coupling.

If the car-coupling should break the pipe-coupling would separate at the point where the pipe H works through the stuffing-box.

Having thus described our invention, we claim as new and desire to secure by Letters Patent—

In a pipe-coupling, the combination and arrangement of the faucets A B, hollow plugs $a$ $b$, elbows $a^2$ $b^2$, pipes C E H, stuffing-box D, flanges J and G, and button-headed bolts $i$ $i$, engaging with notches $g$ $g$, as herein shown and described.

DAVID B. HAND.
EPHRAIM H. REITZEL.

Witnesses:
J. L. PINKERTON,
SIMON C. MAY.